United States Patent [19]

Anderson

[11] Patent Number: 5,640,170
[45] Date of Patent: Jun. 17, 1997

[54] POSITION AND ORIENTATION MEASURING SYSTEM HAVING ANTI-DISTORTION SOURCE CONFIGURATION

[75] Inventor: Peter Traneus Anderson, Burlington, Vt.

[73] Assignee: Polhemus Incorporated, Colchester, Vt.

[21] Appl. No.: 464,304

[22] Filed: Jun. 5, 1995

[51] Int. Cl.⁶ ............................... H01Q 1/36; G01S 5/04; G01B 7/14
[52] U.S. Cl. ........................ 343/895; 343/867; 342/448; 324/461
[58] Field of Search .................................. 343/895, 866, 343/867, 742, 741, 846; 342/448, 451; 324/461, 463, 207.13

[56] References Cited

U.S. PATENT DOCUMENTS

| | | | |
|---|---|---|---|
| 1,567,542 | 12/1925 | Pickard | 343/866 |
| 2,958,081 | 10/1960 | Dyson | 343/895 |
| 3,432,751 | 3/1969 | Godby et al. | 324/43 |
| 3,656,168 | 4/1972 | Stropki | 343/895 |
| 3,683,385 | 8/1972 | Corzine et al. | 343/895 |
| 3,787,871 | 1/1974 | Reese | 343/895 |
| 3,868,565 | 2/1975 | Kuipers | 324/34 R |
| 3,925,784 | 12/1975 | Phelan | 343/895 |
| 3,956,752 | 5/1976 | Phelan et al. | 343/895 |
| 3,983,474 | 9/1976 | Kuipers | 342/424 |
| 3,991,361 | 11/1976 | Mattern et al. | 324/43 R |
| 4,054,881 | 10/1977 | Raab | 342/448 |
| 4,116,057 | 9/1978 | Sullivan | 73/178 R |
| 4,197,855 | 4/1980 | Lewin | 128/653 |
| 4,208,024 | 6/1980 | Killpatrick et al. | 244/3.15 |
| 4,287,809 | 9/1981 | Egli et al. | 324/72 |
| 4,298,874 | 11/1981 | Kuipers et al. | 342/448 |
| 4,303,077 | 12/1981 | Lewin et al. | 128/777 |
| 4,314,251 | 2/1982 | Raab | 324/208 |
| 4,316,253 | 2/1982 | Posséme | 364/432 |
| 4,327,498 | 5/1982 | Setter et al. | 33/333 |
| 4,328,548 | 5/1982 | Crow et al. | 364/449 |
| 4,346,384 | 8/1982 | Raab | 342/451 |
| 4,394,831 | 7/1983 | Egli et al. | 324/260 |
| 4,396,885 | 8/1983 | Constant | 324/208 |

(List continued on next page.)

FOREIGN PATENT DOCUMENTS

| | | |
|---|---|---|
| 0507360 | 10/1992 | European Pat. Off. . |
| 9404938 | 3/1994 | WIPO . |

OTHER PUBLICATIONS

Patent Abstracts of Japan, vol. 018, No. 1765 (P-1716), Mar. 24, 1994, and JP A 5340709, Patent Date: Dec. 21, 1993.

*Primary Examiner*—Hoanganh T. Le
*Attorney, Agent, or Firm*—Price, Heneveld, Cooper, DeWitt & Litton

[57] ABSTRACT

A method and apparatus for determining the position and orientation of a remote object relative to a reference coordinate frame includes providing a source having a plurality of field-generating elements, wherein the field-generating elements generate electromagnetic fields and have spatially independent components defining a source reference coordinate frame. A driver applies signals to the source to generate a plurality of electromagnetic fields which are distinguishable from one another and a remote sensor has a plurality of field-sensing elements which sense each of the generated electromagnetic fields. A processor processes the output of the sensor in a remote object position and orientation relative to the source reference coordinate frame. At least one of the field-generating elements of the source has at least one electrically conductive sheet and a planar coil including a plurality of coplanar concentric rings above the conductive sheet. The planar coil is configured in a manner that a signal applied to that coil will cause a current density at each ring that is inversely proportional to the square of the radius of that ring. The planar coil may be made from a conductor formed as a simple or foliated spiral. The planar coil and the electrically conductive sheet may be formed from printed circuit board stock. A dihedral source may be made from a pair of orthogonal electrically conductive sheets each having a planar coil above the sheet. A trihedral source may be made from three electrically conducting sheets each having a planar coil above the sheet.

33 Claims, 5 Drawing Sheets

U.S. PATENT DOCUMENTS

| | | | |
|---|---|---|---|
| 4,453,067 | 6/1984 | Karklys et al. | 219/10.49 R |
| 4,470,013 | 9/1984 | Possémé | 324/207 |
| 4,525,720 | 6/1985 | Corzine et al. | 343/895 |
| 4,560,930 | 12/1985 | Kouno | 324/207 |
| 4,613,866 | 9/1986 | Blood | 342/448 |
| 4,622,644 | 11/1986 | Hansen | 324/251 |
| 4,636,730 | 1/1987 | Bottomley | 324/318 |
| 4,678,994 | 7/1987 | Davies | 324/236 |
| 4,688,037 | 8/1987 | Krieg | 340/825 |
| 4,710,708 | 12/1987 | Rorden et al. | 324/207 |
| 4,737,794 | 4/1988 | Jones | 342/448 |
| 4,742,356 | 5/1988 | Kuipers | 342/448 |
| 4,845,503 | 7/1989 | Adam et al. | 342/448 |
| 4,849,692 | 7/1989 | Blood | 324/208 |
| 4,945,305 | 7/1990 | Blood | 324/207.17 |
| 5,038,104 | 8/1991 | Wikswo, Jr. et al. | 324/258 |
| 5,109,194 | 4/1992 | Cantaloube | 324/225 |
| 5,146,234 | 9/1992 | Lalezari | 343/895 |
| 5,168,222 | 12/1992 | Volsin et al. | 324/207.17 |
| 5,170,175 | 12/1992 | Kobus et al. | 343/895 |
| 5,173,660 | 12/1992 | Marsden | 324/248 |
| 5,187,540 | 2/1993 | Morrison | 356/152 |
| 5,227,807 | 7/1993 | Bohlman et al. | 343/895 |
| 5,313,216 | 5/1994 | Wang et al. | 343/895 |

POSITION AND ORIENTATION MEASURING SYSTEM HAVING ANTI-DISTORTION SOURCE CONFIGURATION

BACKGROUND OF THE INVENTION

This invention relates to position and orientation measuring systems (POS) which determine remote object position and orientation and, more particularly, to an electromagnetic POS having a source which produces a plurality of electromagnetic fields which are distinguishable from one another, a remote sensor which senses the generated electromagnetic fields and a processor which processes the output of the sensor into remote object position and orientation relative to a reference coordinate frame of the source. More particularly, the invention relates to an improved source for an electromagnetic position and orientation measuring system.

Remote object position and orientation measuring systems employing electromagnetic coupling are disclosed in U.S. Pat. No. 3,868,565 issued to Jack Kuipers for an OBJECT TRACKING AND ORIENTATION DETERMINING MEANS, SYSTEM AND PROCESS and U.S. Pat. No. 4,054,881 issued to Frederick Raab for a REMOTE OBJECT POSITION LOCATOR. Such systems traditionally have a source assembly that includes a plurality, typically three, of concentrically positioned, orthogonal field-generating antennas for generating a plurality of electromagnetic fields. Signals are applied to the field-generating antennas that are multiplexed so that the resulting electromagnetic fields are distinguishable from one another. Located at the remote object is a sensor having a plurality, also typically three, of concentrically positioned, orthogonal receiving antennas for receiving the electromagnetic fields generated by the transmitting antenna and producing signals corresponding to the received electromagnetic fields. A processor resolves the signals produced by the receiving antennas into remote object position and orientation in the reference coordinate frame of the source.

One application for such position and orientation measuring system (POS) is as a three-dimensional digitizer for determining and digitizing the coordinates of a three-dimensional object. In such a digitizer, the source may be embedded in a table having an integral work surface, or digitizing tablet, upon which the object to be digitized is placed. A hand-held stylus is used for tracing and determining points of interest on the surface of the object. The remote sensor is disposed in the stylus and the stylus is provided with a projection for defining a point of contact between the stylus and the surface of the object of interest. Since the point of contact of the stylus and the remote sensor are provided with a known relationship, the coordinates of the surface of the three-dimensional object touched by the stylus may be determined from the position and orientation of the sensor in the coordinate frame of the work surface.

One difficulty with a digitizer utilizing an electromagnetic POS is that the work surface, or digitizing tablet, cannot be located on a table including a substantial amount of electrically conductive or ferromagnetic metal. The electromagnetic fields generated by the source of the apparatus induce eddy currents in the metal. The eddy currents produce an electromagnetic field which distorts the field generated by the source, inducing error in the measured fields and, hence, the calculated position and orientation of the remote object. Various methods exist to map distortion and to compensate for the distortion in the POS processor. However, if the distortion is too severe, such mapping may not adequately compensate for the distortion.

It may be desirable to be able to place a conventional digitizer source on an electrically conductive or ferromagnetic metal plate. Other applications for which it may be desirable to use an electromagnetic POS may also result in severe magnetic-field distortion with a conventional POS source. For example, it may be desirable to place the digitizer source on a metal table adjacent to a metal wall. It may also be desirable to position a POS source at the corner of a metal-walled rectangular room in order to locate one or more remote objects within the room. In all such applications, the ability to compensate magnetic-field distortions would be nil.

SUMMARY OF THE INVENTION

The present invention provides an electromagnetic position and orientation measuring system having a novel source configuration which produces low distortion magnetic fields in one portion of a three-dimensional space notwithstanding the presence of electrically conductive or ferromagnetic metal in another portion of the electromagnetic space. This is accomplished by positioning a conductive sheet in order to divide the space into two portions and producing an electromagnetic field on one side of the sheet. The electromagnetic field that is produced has a dipole moment that is normal, or orthogonal, to the sheet. A constant magnetic dipole moment in a low distortion magnetic field is produced in the space portion on the one side of the sheet.

A source configured according to the invention includes an electrically conductive sheet and a planar coil mounted parallel to and near the sheet. The planar coil includes a plurality of substantially coplanar concentric rings. The coil is configured in a manner that a signal applied to the coil will have a current density at each ring that is inversely proportional to the square of the radius of that ring. Such source configuration produces quasi-static magnetic fields which do not significantly penetrate the electrically conducting sheet. It is believed that this is a result of the normal component of the magnetic field at the surface of the electrically conductive sheet being substantially time-invariant. The electrically conducting sheet functions as a mirror for orthogonal antennas of the source which produce dipole moments parallel to the electrically conductive sheet.

The present invention finds applications where it is desired to measure the position and orientation of a remote object in the coordinate reference frame of a three-dimensional space, but wherein the remote object is restricted for movement within a portion of the space. In this manner, the presence of even very large quantities of electrically conductive or ferromagnetic metals in other portions of the space, where the remote object is not positioned, will have no substantial effect upon the accurate determination of position and orientation of the remote object.

These and other objects, advantages, and features of this invention will become apparent upon review of the following specification in conjunction with the drawings.

DESCRIPTION OF THE PREFERRED EMBODIMENT

Figure 1:
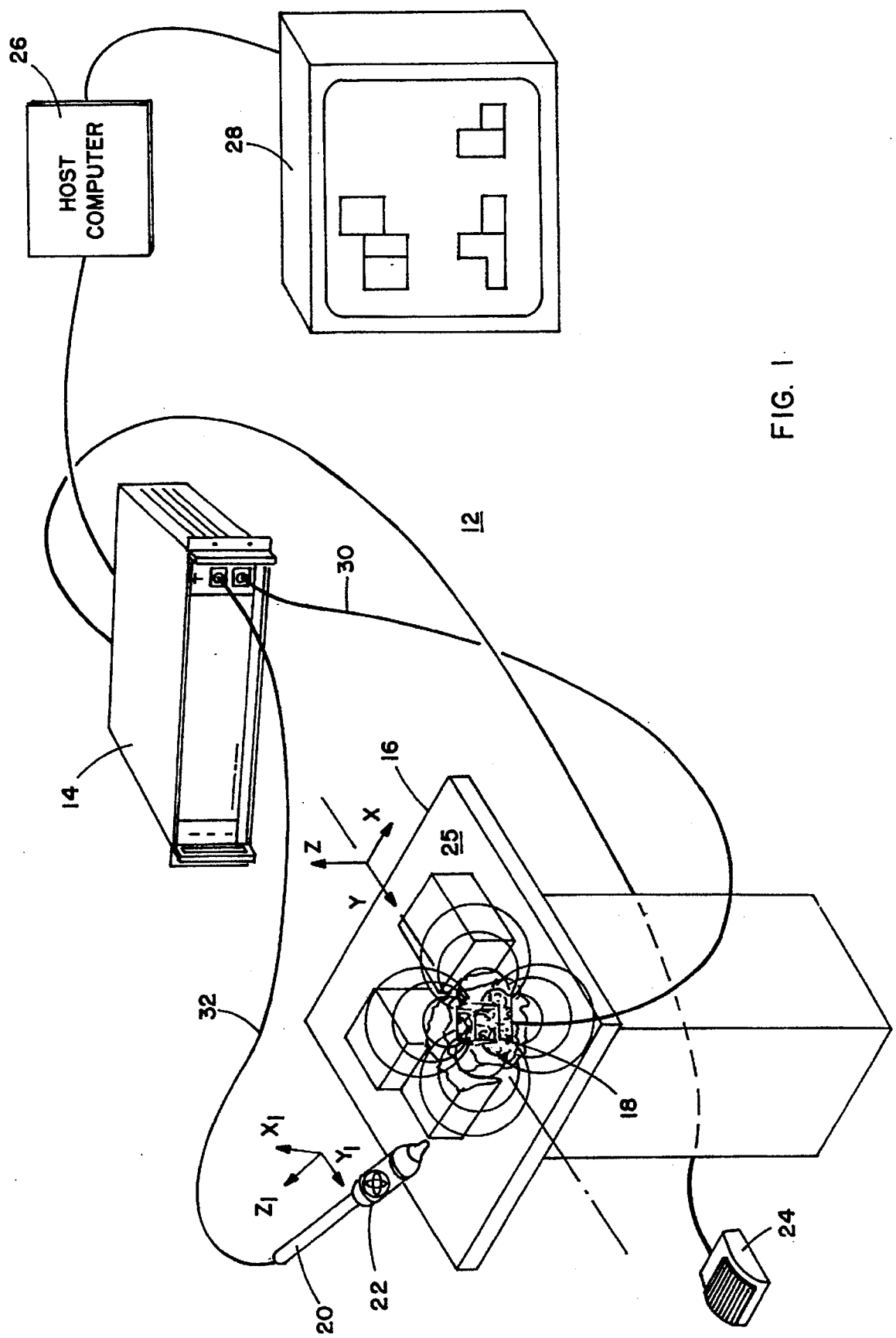
FIG. 1 is a block diagram illustrating a position and orientation measuring system useful with the invention.

Referring now specifically to the drawings, and the illustrated embodiments depicted therein, a position and orientation measuring system (POS) is embodied in a three-dimensional digitizer 12 (FIG. 1). The digitizer includes an electronic computing unit, or processor, 14, an object table 16, a source 18 of electromagnetic fields, a stylus 20, including a sensor 22 having a plurality of receiving antennas, and a foot switch 24. The output of processor 14 is typically provided to a host computer 26 where various software packages can be used to transform the digitized coordinates of the object traced on object table 16 into useful information, such as layout drawings, perspective views, material lists, or a database for graphic image generation. Typically, the output of host computer 26 is inputted to a visual display, such as a monitor 28. Source 18 is composed of three independent loop antennas which each define a magnetic dipole field. The loops of the three antennas are oriented such that three orthogonal dipole magnetic fields are created, one of the fields being identified with one of the X, Y, and Z axes of the work surface of object table 16 such that the electromagnetic fields define a reference coordinate frame. Processor 14 includes a driver connected to source 18 by lines schematically illustrated at 30 for applying to the three loop antennas electrical signals which generate the three dipole magnetic fields associated with the X, Y, and Z directions, respectively. The electrical signals applied to the three loop antennas are multiplexer so that the resulting dipole magnetic fields are distinguishable from one another. A variety of alternative multiplexing techniques include time division, frequency, and phase-multiplexing. Sensor 22 includes a plurality of receiving antennas for receiving components of the electromagnetic fields transmitted by source 18. Preferably, the receiving antennas also are composed of three loop antennas. The three loop antennas defining sensor 22 are oriented in mutually orthogonal directions so that the antennas define a sensor coordinate frame $X_1$, $Y_1$, $Z_1$. The output of the antenna triad defining sensor 22 is connected to processor 14 by lines schematically illustrated at 32. Digitizer 12 is disclosed in more detail in commonly assigned U.S. Pat. No. 4,613,866 issued Sep. 23, 1986, for a THEE-DIMENSIONAL DIGITIZER WITH ELECTROMAGNETIC COUPLING, the disclosure of which is hereby incorporated herein by reference.

Although the POS illustrated in FIG. 1 is embodied in a digitizer 12, many other applications are possible. In other applications, the sensor can be associated with a particular body part for the purpose of conducting biomedical studies or for manipulating three-dimensional images displayed on a design computer. In an important military application, the sensor is associated with the helmet-sighting reticle of the pilot of a military aircraft for determining the line of sight of the pilot to a target and, thereafter, initializing ordnance which is directed along the line of sight to the target. In the field of head motion sensing, generally, the system can be employed as an input to a virtual reality system in order to drive a displayed image to coincide with the user's head position. Still another application involves the monitoring of the body movements of an invalid for the purpose of creating a non-verbal communication system or providing a technique for remote-controlling various devices with non-verbal communicative body motion.

Figure 2:
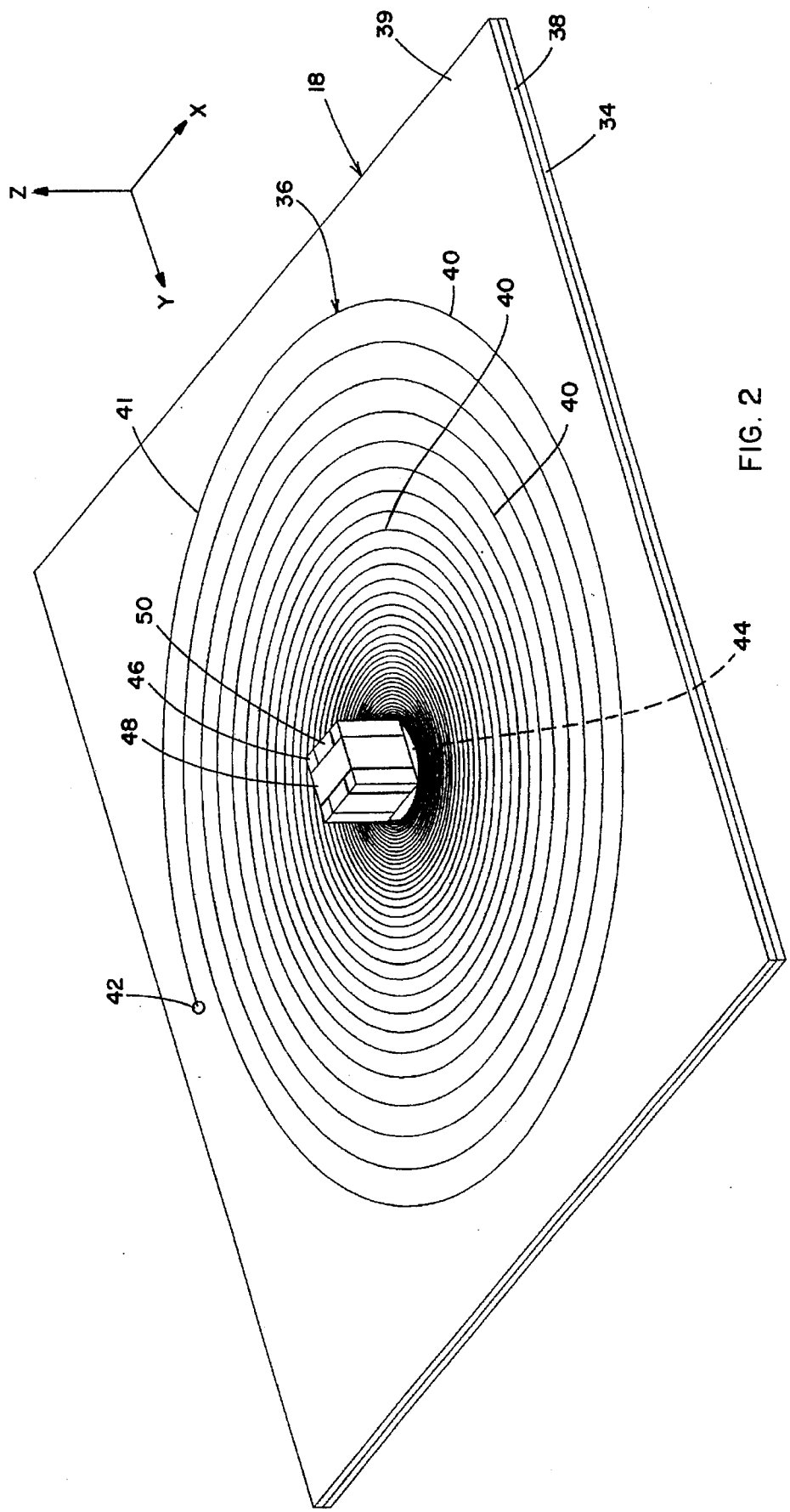
FIG. 2 is a perspective view of a source, according to the invention.

Source 18, according to the invention, includes an electrically conducting sheet 34 positioned at the Z=0 plane of the source reference coordinate system (FIG. 2). A planar coil 36 is positioned close to electrically conducting sheet 34. In the illustrated embodiment, planar coil 36 is mounted to a thin insulating sheet 38 which separates the coil from the electrically conductive sheet. Planar coil 36 is made up of a plurality of essentially coplanar concentric rings 40 all positioned in a plane parallel to electrically conductive sheet 34. In the illustrative embodiment, concentric rings 40 are made from an electrical conductor 41 formed into a simple spiral. Conductor 41 has a first terminal 42 positioned at the outer perimeter of the coil and a second terminal 44 positioned at the center of concentric rings 40. Planar coil 36 is constructed such that, when an electrical signal is applied across terminals 42, 44, the density of the current induced in each ring 40 is inversely proportional to the square of the radius of that ring. Such current density may be accomplished as follows.

Electrically conductive sheet 34, planar coil 36, and insulating sheet 38 may be made from printed circuit board stock. Current density may be established at the desirable level by making the width of the copper track inversely proportional to the square of the radius of the center of the track. Planar coil 36 may be etched from one of the conductive sheets on one side of insulating sheet 38 by providing only a minimal-width spiral line of a copper-free insulating surface between the windings. In this manner, the conducting copper track is of minimal width close to the center of the coil and widens progressively outwardly. The result is that the current density may be controlled by the geographic layout of planar coil 36.

In a spiral:

$$r . \text{THETA} = \text{constant} \quad (1)$$

where r is the radius of the point on the spiral and THETA is the angle measured from the X axis. In the illustrated embodiment, THETA varies from 40*pi at the outside to 800*pi at the inside, resulting in 380 turns in the spiral. At the outside, the radius is 20 inches and the turns of the insulating spiral are one inch apart center-to-center. At the inside, the radius of the ring is one inch and the turns of the insulated spiral are 1/400 inch apart, center-to-center. Because the thickness of the track is equal at all points, the width is proportional to the cross-sectional area. As the track gets wider, the current density gets smaller. The product of current density and track cross-sectioned area is equal to the total current in the track.

In an alternative embodiment, a second spiral (not shown) is formed on printed circuit board 39 on the opposite side of insulating sheet 38. If such additional coil is formed, then a separate electrically conductive sheet 34 is utilized. The second insulating spiral on the opposite side of printed circuit board 39 spirals in the same direction as planar coil 36. Current flows outward on one side and inward on the other side so that the two sides generate magnetic field in the same direction. In this alternative embodiment, a large number of plated-through holes are placed uniformly around the periphery of printed circuit board 39 in order to preserve a uniform current distribution around the periphery.

Planar coil 36 positioned at Z=0 produces Z-dipole magnetic fields. A conventional coil assembly 46 is provided at the center of printed circuit board 39 in order to produce X-dipole and Y-dipole magnetic fields. Coil assembly 46 includes a Y coil 48 for producing Y-dipole magnetic fields and an X coil 50 for producing X-dipole magnetic fields. Although not shown, a discrete Z coil may be included with coil assembly 46 and connected in series with planar coil 36 in order to increase the turns-density at the center of the coil.

In the illustrated embodiment, a simple spiral is disclosed. The simple spiral has closely spaced turns near the center, but widely spaced turns near the outer edge. These widely spaced turns may cause localized field distortions close to the plane of the spiral at the edge. Such local distortions may be difficult to map and compensate for. In order to overcome such difficulties, a foliated spiral may be utilized. A foliated spiral is constructed by a repeated subdividing of the current paths into parallel tracks as the conductor defining the coil spirals outwardly. Starting at the center of the spiral, the track has minimum center-to-center turn spacing. As the conductor spirals outwardly, the spacing increases. When the spacing reaches twice the minimum center-to-center spacing, a new spiral is started halfway between the turns of the existing conductor by splitting the conductor into two tracks. At such radius, two spiral tracks are present, each carrying half the current. The spacing between adjacent turns is at the minimum center-to-center spacing. Both tracks spiral outwardly until the spacing reaches twice the minimum. Each track is then split into two tracks for a total of four tracks. This pattern is repeated outwardly for the entire coil. The foliated spiral reduces local distortions by limiting maximum turn spacing. In order to cause the current in all of the tracks around the outer edge to be equal, series ballast resistors or active current drivers may be used to adjust the current. If active drivers are used, each driver provides a fraction of the current. This makes individual drivers simple and smaller than a single driver for a simple spiral.

Electrically conducting plane 34 acts as a mirror for magnetic fields wherein the magnetic field at any point above the plane is the sum of the field generated by the sources in that space and the field generated by eddy currents from the conducting plane. By placing the source coils near the conducting plane, with the conducting plane positioned at Z=0 coordinates, the X-dipole moment is parallel to and in front of the plane. The X dipole generates an image-dipole moment parallel to and behind the plane. The image-dipole moment is the same strength as, and in the same direction as, the X-dipole moment. Therefore, the image-dipole moment and the X-dipole moment become collocated creating one dipole moment of twice the strength of the original X-dipole moment. The same applies to the Y-dipole moment. The Y-dipole magnetic field is substantially undistorted and double the strength of the Y-dipole magnetic field when the source is in free space.

As will be described in more detail below, coil 36 which is positioned at Z=0 produces a constant magnetic dipole moment which is normal to conducting plane 34. In practice, the Z-dipole field is somewhat distorted close to the conducting plate, the lines of flux curve inward towards the plate rather than being normal to the plate. However, the generated electromagnetic fields are sufficiently non-distorted farther from the plate in order to produce accurate results.

The invention is based upon the ability to generate a quasi-static dipole magnetic field with the dipole moment normal to a conducting plane or plate. By placing an actively forced current sheet, in the form of the concentric rings, close to the conducting plane, magnetic fields are produced which do not behave according to normal boundary conditions of a conducting plane. By forcing the current density in each ring to be inversely proportional to the square of the radius of the ring, the product of the current density in a ring times the area enclosed by that ring is a constant. The constant is 2m where m is the magnetic dipole moment. As will be set forth in more detail below, the magnetic vector potential, and, hence, the magnetic field, is that of a dipole with magnetic moment equal to m, normal to the conducting plane. If the magnetic fields are generated by slowly varying currents, the source is operating near-field and radiation effects can be ignored. Such quasistatic magnetic fields do not penetrate the conductive sheet because the normal component of the magnetic field at the surface of the sheet is substantially time-variant.

The vector potential of a finite-sized circular current loop in free space in the Z=0 plane, centered on the Z axis, may be represented by:

$$A_0 = \frac{\mu I}{2\pi} \int_{\phi=0}^{\pi} \frac{a \cos(\phi)}{[a^2 + p^2 + Z^2 - 2ap\cos(\phi)]^{1/2}} d\phi \qquad (2)$$

where:

(p, $\Phi$, Z) are cylindrical coordinates,
$\mu$=permeability of free space,
$\alpha$=loop radius, and
I=current in the loop By symmetry, the vector potential has only a $\Phi$ component, $A_o$. For an infinite array of coplanar concentric circular rings, the current density in each ring is represented by:

$$I = m/(2\pi \alpha^2) \qquad (3)$$

The $\Phi$ component of the vector potential is:

$$A_1 = \frac{\mu m}{4\pi^2} \int_{\phi=0}^{\pi} \int_{a=0}^{\infty} \frac{\cos(\phi)}{a[a^2 + p^2 + Z^2 - 2ap\cos(\phi)]^{1/2}} da \, d\phi \qquad (4)$$

The $\Phi$ component is integrated over $\alpha$, as illustrated in equation 5:

$$A_1 = \frac{\mu m}{4\pi^2} \int_{\phi=0}^{\pi} \frac{-\cos(\phi)}{(p^2+Z^2)^{1/2}} \log\left(1 + \frac{-p\cos(\phi)}{(p^2+Z^2)^{1/2}}\right) d\phi + \qquad (5)$$

$$\frac{\mu m}{4\pi^2} \lim_{a \to 0} \left[ \log\left(\frac{2(p^2+Z^2)^{1/2}}{a}\right) \int_{\phi=0}^{\pi} \cos(\phi) \, d\phi \right]$$

The second term of equation 5 is zero. Equation 5, therefore, becomes:

$$A_1 = \frac{\mu m}{4\pi p}\left(1 + \frac{-Z}{(p^2+Z^2)^{1/2}}\right) \qquad (6)$$

When an array of current carrying conductors is placed extremely close to a conducting plane, the vector potential is the negative of the Z-gradient of the vector potential of the array alone. Thus, the $\Phi$ component of the vector potential of the array of coplanar rings placed near to a conducting sheet is:

$$A = -\frac{d}{dz} A_1 \qquad (7)$$

By combining equations 6 and 7:

$$A = \frac{\mu\, m\, p}{4\pi\,(p^2 + Z^2)^{3/2}} \quad (8)$$

Equation 8 may be converted to spherical coordinates where $p = r\sin(\theta)$ and $Z = r\cos(\theta)$:

$$A = \frac{\mu\, m\, \sin(\theta)}{4\pi\, r^2} \quad (9)$$

Equation 9 illustrates the vector potential of an ideal dipole in free space with the dipole magnetic moment m normal to the plane. Therefore, an array of coplanar concentric current rings, with the current density inversely proportional to the square of the ring radius, placed near to a conducting plane, produces a dipole magnetic field with dipole moment normal to the plane.

Although planar coil 36 is illustrated as a circular coil, particular applications may be better suited with a rectangular-shaped coil. This may be accomplished in several ways. A spiral coil may be constructed that is large enough to cover the entire rectangular area with parts of the spiral extending beyond the boundaries of the rectangle. These extraneous parts may be folded under the remaining portions of the spiral so that they lie within the rectangle and at the same time are very close to the conductive plate. The result is that the current still has a path to flow, but the folded parts of the spiral produce little magnetic field because they are close to the magnetic plate. This may additionally be accomplished by placing the extraneous parts of the spiral close to but under the plate.

Another technique for producing a rectangular coil is to produce a modified elliptical spiral, which fills most of the rectangle. Any distortion in the field will have smooth gradients. Therefore, compensation algorithms will readily correct for any such distortion. This may be accomplished by stretching one axis, such as the X axis, by a scale factor greater than 1. To convert any point (X, Y) on the circular spiral to the corresponding point (U, V) on the "rectangular" spiral, the (X, Y) coordinates are converted to polar coordinates (r, THETA). For each value of r, THETA is calculated as follows:

$$\text{THETA} = \text{ARCTAN}(Y/X) \quad (10)$$

By choosing values of THETA that put (r, THETA) in the same quadrant as (X, Y), the program (11), which is in fortran, will calculate the corresponding points (U, V) on the rectangular spiral.

```
CTPTU = COS(THETA)
STPTU = SIN(THETA)
MODIFY R TO CONVERT CIRCLE TO SQUARE
USING PIET HEIN'S SUPEREGG EQUATION
RORMX = R/RMAX
ALP = 0.5 + 1.5 * EXP(4.0*LOG(2)*RORMX*RORMX)
ABSCO = ABS(CTPTU) + 0.000001
ABSSI = ABS(STPTU) + 0.000001
XRMOD = EXP(LOG(ABSCO)*ALP)+EXP
(LOG(ABSSI)*ALP)
YRMOD = 1.0/RMOD
R = R * YRMOD
CONVERT FROM POLAR TO CARTESIAN
COORDINATES
SCALE X TO CONVERT SQUARE TO RECTANGLE
XSCLF = (SCF - 1) * RORMX * RORMX + 1
U = R * CTPTU * XSCLF
V = R * STPTU
```

Figure 3:
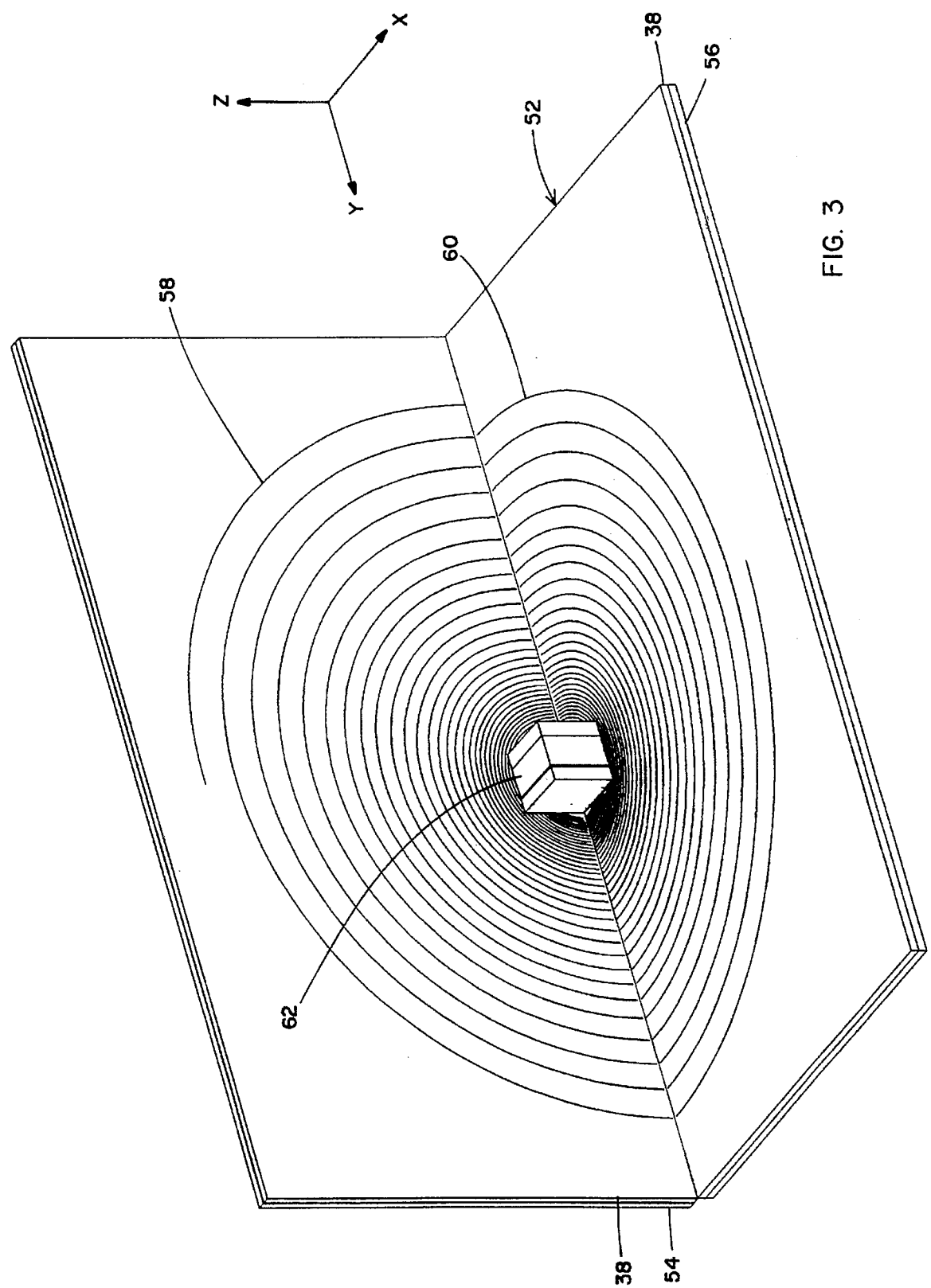
FIG. 3 is a perspective view of an alternative embodiment of the invention.

The description of the preferred embodiment, so far, pertains to a source which generates a set of three orthogonal dipole magnetic fields on a flat plate of electrically conducting material. A dihedral source 52, provided according to the invention, allows the invention to be utilized in an environment having orthogonal distortion-causing metal surfaces, such as a metal tabletop adjacent to a metal wall (FIG. 3). Dihedral source 52 includes electrically conductive sheets 54 and 56, which are mutually orthogonal and positioned on the X, Y and Y, Z planes. A simple or foliated half-spiral 58 is spaced just above conductive sheet 54 with the center of the spiral at the junction between plates 54 and 56. A simple or foliated half-spiral 60 is located near the electrically conductive sheet 56 with its center adjacent to the center of half-spiral 58. A current in half-spiral 58 produces an X-dipole magnetic field. A current in half-spiral 60 produces a Z-dipole magnetic field. A discrete coil 62 is placed close to the center of half spirals 58 and 60 with the axis of coil 62 in the Y direction. A current in coil 62 produces a Y-dipole magnetic field. In this manner, dihedral source 52 produces three orthogonal dipole magnetic fields in the portion of space bounded by orthogonal conductive sheets 54 and 56.

Figure 4:
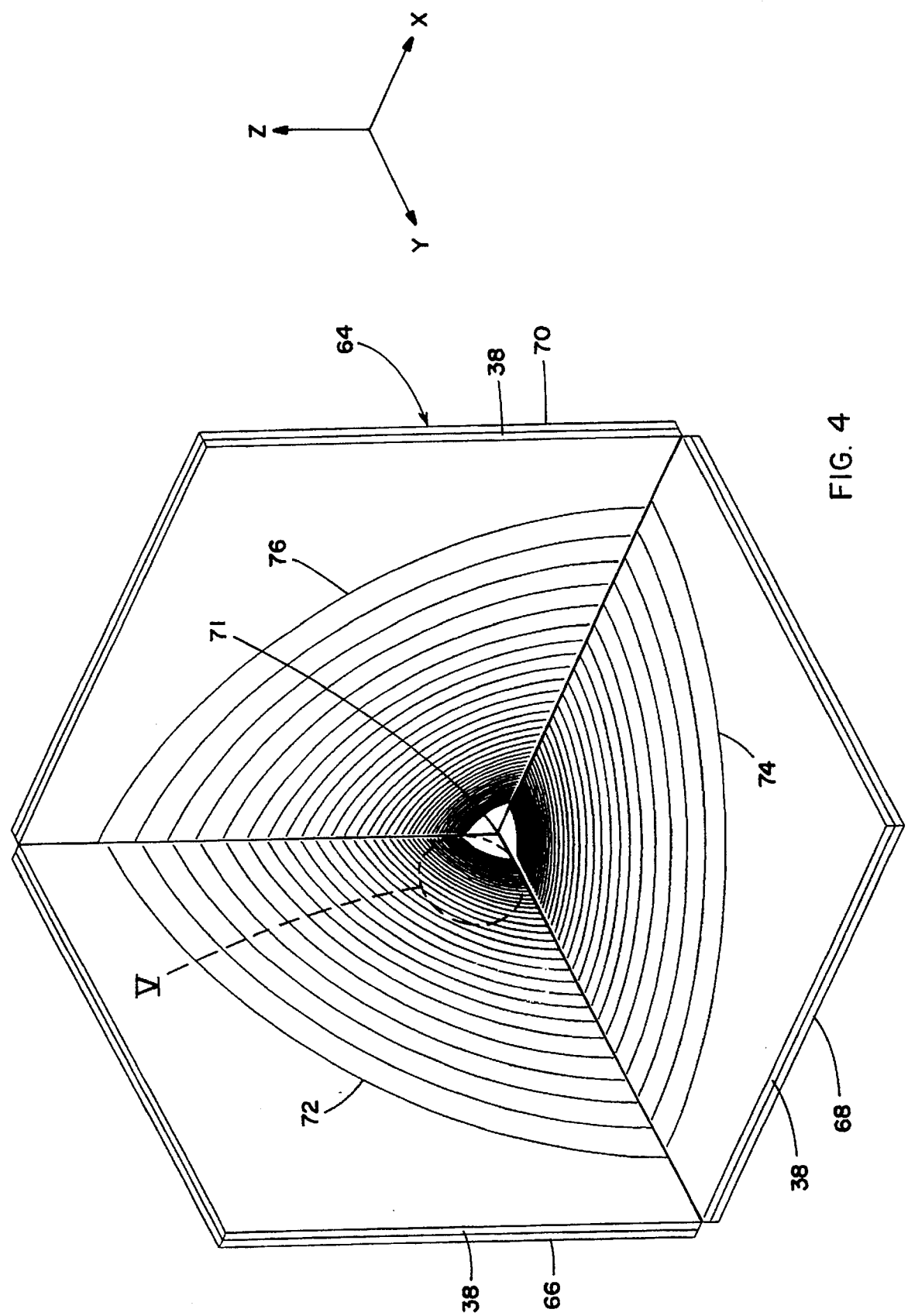
FIG. 4 is a perspective view of another alternative embodiment of the invention.

A trihedral source 64 is capable of use in an environment where three distorting metal sheets are oriented in orthogonal directions (FIG. 4). Such an environment may include a corner of a metal-walled rectangular room. Trihedral source 64 includes electrically conductive sheets 66, 68, and 70, which are mutually perpendicular and form a trihedral angle. The conductive sheets are placed so that all three sheets intersect at a common vertex 71 of the source forming a corner. A simple or foliated quarter-spiral coil 72 is positioned near conductive sheet 66 with the center of the quarter-spiral placed at vertex 71 of the source. Current in quarter-spiral 72 produces an X-dipole magnetic field. A simple or foliated quarter-spiral 74 is located close to conductive sheet 68 with the center of the quarter spiral placed at vertex 71. Current in quarter spiral 74 produces a Z-dipole magnetic field. A simple or foliated quarter spiral 76 is located near conductive sheet 70 with the center of the quarter spiral placed at vertex 71. A current in quarter-spiral 76 produces a Y-dipole magnetic field. The three quarter-spirals produce the required three orthogonal dipole magnetic fields.

Figure 6:
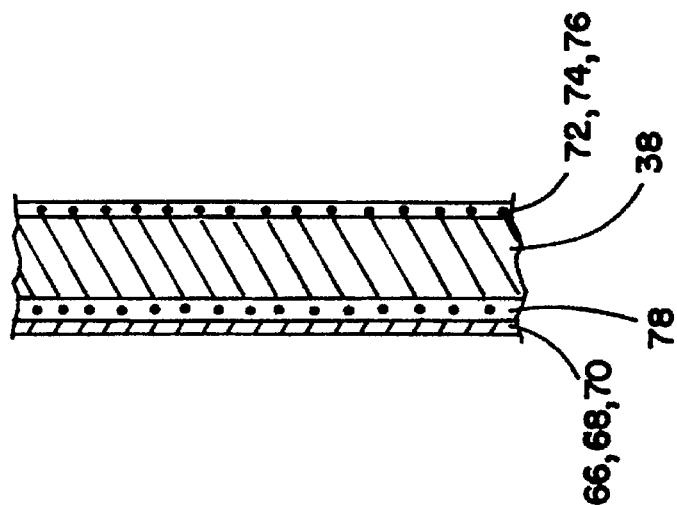
FIG. 6 is a sectional view taken along the lines VI—VI in FIG. 5.
Figure 5:
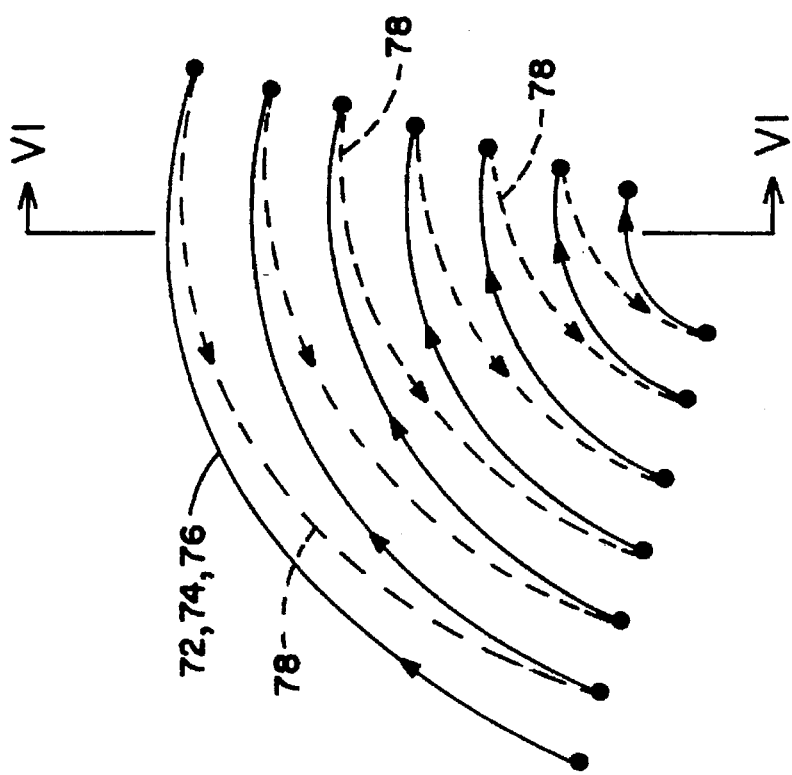
FIG. 5 is an enlargement of the portion illustrated at V in FIG. 4.

As illustrated in FIGS. 5 and 6, return tracks 78 for each of the quarter rings in quarter spirals 72, 74, and 76 may be provided close to the respective conductive sheet 66, 68, 70 in order to complete the current circuit. A similar configuration for return tracks may be utilized for each of the half-spirals 58, 60 in dihedral source 52.

A source, according to the invention, would preferably operate with a planar coil that is infinitely close to an electrically conducting sheet that is a perfect conductor. While such conditions cannot be met, a preferred embodiment is provided by forming the conductive sheet or sheets from a superconducting material. In the illustrated embodiment, the signal applied to each of the coils of the source is selected to be in the range of between 8 kHz and 20 kHz, although lower or higher frequencies may be utilized. In the illustrated embodiment, a 120 Hz update rate is provided. A unique source, according to the invention, has been built and successfully operated in combination with a FASTRAK electronics unit manufactured by Applicant's assignee, Polhemus Inc. of Colchester, Vermont. Operation of the unit has been satisfactory in all respects.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A source for a position and orientation measuring system having a driver which applies signals to said source to generate a plurality of electromagnetic fields which are distinguishable from one another, a remote sensor which senses the generated electromagnetic fields and a processor which processes an output of said sensor into remote object position and orientation relative to a reference coordinate frame of said source, comprising:

an electrically conducting sheet; and a planar coil including a plurality of substantially coplanar concentric rings above said sheet, said planar coil being adapted for coupling to the driver for receiving signals from the driver to generate a low-distortion electromagnetic field that may be sensed by said sensor.

2. The source in claim 1 wherein said coil is configured in a manner that a signal applied to said coil will produce a current density at each ring inversely proportional to the square of the radius of that ring.

3. The source in claim 2 wherein said planar coil includes a conductor formed as a spiral.

4. The source in claim 3 wherein said conductor has a cross-sectional area that varies inversely proportional to the square of the radius of the center of the conductor at substantially any place along the conductor.

5. The source in claim 4 wherein said conductor is formed from at least one conductive layer of a printed circuit board.

6. The source in claim 1 including a second coil at the center of said concentric rings and oriented orthogonal to said planar coil.

7. The source in claim 1 wherein said concentric rings are formed from at least one conductive layer of a printed circuit board.

8. The source in claim 7 wherein said concentric rings are formed as a spiral.

9. The source in claim 1 wherein said electrically conductive sheet is a superconductor.

10. A method of determining the position and orientation of a remote object located on one side of a plane relative to the reference coordinate system of said plane in a manner that is substantially unaffected by eddy current-induced field distortion on an opposite side of said plane, including:

positioning a conductive sheet relative to said plane;

producing an electromagnetic field on said one side of said conductive sheet, said electromagnetic field having a dipole moment substantially normal to said conductive sheet;

sensing said electromagnetic field with a remote sensor; and processing the output of said remote sensor into remote position and orientation relative to said plane.

11. The method of claim 10 wherein said producing an electromagnetic field includes providing an array of substantially coplanar concentric rings adjacent said conductive sheet and inducing a current in each of the rings having a current density inversely proportional to the square of the radius of that ring.

12. The method of claim 11 wherein said providing an array of rings includes providing a conductor formed as a spiral.

13. The method of claim 10 wherein said positioning a conductive sheet includes providing a sheet of superconductor material.

14. The method of claim 10 wherein said producing an electromagnetic field also includes producing at least one other electromagnetic field that is distinguishable from said electromagnetic field having a dipole moment substantially normal to said conductive sheet, said at least one other electromagnetic field having a dipole moment parallel to said plane.

15. The method of claim 14 wherein said producing at least one other electromagnetic field includes positioning another conductive sheet orthogonal to said plane, producing another electromagnetic field on one side of said another sheet, said another electromagnetic field having a dipole moment normal to said another sheet.

16. The method of claim 14 wherein said producing at least one other electromagnetic field includes positioning at least two mutually orthogonal conductive sheets orthogonal to said plane, producing another electromagnetic field on one side of each of said mutually orthogonal sheets, each said another electromagnetic field having a dipole moment normal to one of said mutually orthogonal sheets.

17. A source for a position and orientation measuring system having a driver which applies signals to said source to generate a plurality of electromagnetic fields which are distinguishable from one another, a remote sensor which senses the generated electromagnetic fields and a processor which processes an output of said sensor into remote object position and orientation relative to a reference coordinate frame of said source, comprising:

at least two mutually orthogonal electrically conducting sheets; and a planar coil above each of said sheets, each said coil including a plurality of substantially coplanar concentric rings and being adapted for coupling to the driver for receiving signals from the driver to generate a low-distortion electromagnetic field that may be sensed by said sensor.

18. The source in claim 17 wherein each said planar coil is configured in a manner that a current applied to that planar coil will have a density at each ring inversely proportional to the square of the radius of that ring.

19. The source in claim 18 wherein each said planar coil includes a conductor formed as a spiral.

20. The source in claim 19 wherein said conductor has a cross-sectional area that varies inversely proportional to the square of the radius of the center of the conductor at substantially any place along the conductor.

21. The source in claim 20 wherein said conductor is formed from at least one conductive layer of a printed circuit board.

22. The source in claim 17 including a second coil at the center of said concentric rings and oriented orthogonal to each said planar coil.

23. The source in claim 17 wherein each said electrically conductive sheet is a superconductor.

24. The source of claim 17 wherein said at least two electrically conductive sheets includes three mutually orthogonal conductive sheets.

25. An apparatus for determining the position and orientation of a remote object relative to a reference coordinate frame, comprising:

a source having a plurality of field-generating elements, wherein said field-generating elements generate electromagnetic fields and have spatially independent components defining a source reference coordinate frame, at least one of said field-generating elements having at least one electrically conducting sheet and a planar coil including a plurality of substantially coplanar concentric rings above said at least one conductive sheet configured in a manner that a signal applied to that coil will cause a current density at each ring inversely proportional to the square of the radius of that ring;

a driver which applies signals to said source to generate a plurality of electromagnetic fields which are distinguishable from one another;

a remote sensor having a plurality of field sensing elements, wherein said field sensing elements sense each of said generated electromagnetic fields and have spatially independent components; and a processor which processes the output of said sensor into remote object position and orientation relative to said source reference coordinate frame.

26. The apparatus in claim 25 wherein another of said field-generating elements includes a second coil at the center of said concentric rings and oriented orthogonal to said planar coil.

27. The apparatus in claim 25, wherein two other of said field-generating elements include second and third mutually orthogonal coils at the center of said concentric rings and both orthogonal to said planar coil.

28. The apparatus in claim 25 wherein said planar coil includes a conductor formed as a spiral.

29. The apparatus in claim 28 wherein said conductor has a cross-sectional area that varies inversely proportional to the square of the radius of the center of the conductor at substantially any place along the conductor.

30. The apparatus in claim 29 wherein said conductor is formed from at least one conductive layer of a printed circuit board.

31. The apparatus in claim 25 wherein said at least one electrically conductive sheet includes a pair of orthogonal electrically conductive sheets and including a said planar coil above each of said conductive sheets.

32. The apparatus in claim 25 wherein said at least one electrically conducting sheet includes three orthogonal electrically conductive sheets and including a planar coil above each of said conductive sheets.

33. A source for a position and orientation measuring system having a driver which applies signals to said source to generate a plurality of electromagnetic fields which are distinguishable from one another, a remote sensor which senses the generated electromagnetic fields and a processor which processes an output of said sensor into remote object position and orientation relative to a reference coordinate frame of said source, comprising:

an electrically conducting sheet;

a planar coil including a plurality of substantially coplanar concentric rings above said sheet; and second and third mutually orthogonal coils at the center of said concentric rings and both orthogonal to said planar coil.

* * * * *